(12) United States Patent
Tseng et al.

(10) Patent No.: US 11,818,097 B2
(45) Date of Patent: Nov. 14, 2023

(54) PACKET WATERMARK WITH STATIC SALT AND TOKEN VALIDATION

(71) Applicant: A10 Networks, Inc., San Jose, CA (US)

(72) Inventors: Yutun (Tony) Tseng, San Jose, CA (US); Ahmed Abdelhalim, San Francisco, CA (US); Vernon Richard Groves, Duvall, WA (US); Ching-Wen Huang, San Jose, CA (US)

(*) Notice: Subject to any disclaimer, the term of this patent is extended or adjusted under 35 U.S.C. 154(b) by 380 days.

(21) Appl. No.: 17/239,599

(22) Filed: Apr. 25, 2021

(65) Prior Publication Data
US 2022/0345459 A1    Oct. 27, 2022

(51) Int. Cl.
*H04L 9/40* (2022.01)
*H04L 9/06* (2006.01)

(52) U.S. Cl.
CPC ........ *H04L 63/0245* (2013.01); *H04L 9/0643* (2013.01); *H04L 63/083* (2013.01); *H04L 63/1408* (2013.01)

(58) Field of Classification Search
CPC .............. H04L 63/0245; H04L 63/083; H04L 63/1408; H04L 63/1441; H04L 9/0643; H04L 9/0861; H04L 9/3213; H04L 9/3239; H04L 2463/081
See application file for complete search history.

(56) References Cited

U.S. PATENT DOCUMENTS

| | | | | |
|---|---|---|---|---|
| 8,843,997 B1* | 9/2014 | Hare | ........... | H04L 63/0815 709/200 |
| 2003/0093680 A1* | 5/2003 | Astley | ........... | G06F 21/445 713/183 |
| 2006/0256961 A1* | 11/2006 | Brainard | ........... | G06F 21/31 380/44 |

(Continued)

OTHER PUBLICATIONS

Sherry et al. "BlindBox: Deep Packet Inspection over Encrypted Traffic" Aug. 21, 2015 [Online], [Retrieved on: Jun. 26, 2023], SIGCOMM 2015, www.acm.org, Retrieved from: < https://dl.acm.org/doi/pdf/10.1145/2785956.2787502 > (Year: 2015).*

(Continued)

*Primary Examiner* — Eric W Shepperd
(74) *Attorney, Agent, or Firm* — Keith Kline; The Kline Law Firm

(57) ABSTRACT

A method and system for mitigating a threat associated with network data packets are provided. The method commences with receiving, by an authentication server, a request for access to a server from a client. The method further includes authenticating the client by the authentication server. The authentication includes providing an authentication token to the client. The method continues with receiving, by a mitigation device, from the client, at least one network packet directed to the server. The at least one network packet embeds the authentication token. The method further includes validating, by the mitigation device, authenticity of the authentication token and selectively forwarding, based on the validation, the at least one network packet to the (Continued)

server. The authentication token is independently generated by the authentication server, the mitigation device, and the server using a shared token generation algorithm based on a hash salt value.

20 Claims, 5 Drawing Sheets

(56) References Cited

U.S. PATENT DOCUMENTS

| | | | | |
|---|---|---|---|---|
| 2009/0164796 | A1* | 6/2009 | Peirce | H04L 9/3234 |
| | | | | 713/186 |
| 2011/0283110 | A1* | 11/2011 | Dapkus | H04L 63/1408 |
| | | | | 713/182 |
| 2012/0084561 | A1* | 4/2012 | Soulios | H04L 9/3213 |
| | | | | 713/168 |
| 2015/0058976 | A1* | 2/2015 | Carney | H04L 63/1408 |
| | | | | 726/22 |
| 2016/0352790 | A1* | 12/2016 | Hollingsworth | H04L 12/1886 |
| 2017/0346851 | A1* | 11/2017 | Drake | H04L 9/0838 |
| 2018/0048631 | A1* | 2/2018 | Waltermann | H04L 63/0428 |
| 2018/0255004 | A1* | 9/2018 | Lanka | H04L 67/55 |
| 2020/0067970 | A1* | 2/2020 | Compton | H04L 63/1441 |
| 2021/0360025 | A1* | 11/2021 | O'Hara | H04L 63/0892 |

OTHER PUBLICATIONS

Shah et al. "Network based packet watermarking using TCP/IP protocol suite" [Online], Feb. 16, 2012[Retrieved on: Jun. 26, 2023], www.ieee.org, Retrieved from: < https://ieeexplore.ieee.org/stamp/stamp.jsp?tp=&arnumber=6153253 > (Year: 2012).*

* cited by examiner

PACKET WATERMARK WITH STATIC SALT AND TOKEN VALIDATION

TECHNICAL FIELD

This disclosure relates generally to data processing and more particularly to mitigation of threats associated with network data traffic by using network packet watermarks with static salt and token validation.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

In computer networking, the User Datagram Protocol (UDP) is a an Internet protocol that can be used to send direct messages known as datagrams. Sending UDP packets does not require going through handshake procedures or establishing communication sessions. Thus, the UDP is not a secure Internet protocol because it allows any party to send any number of network packets to a server, leaving it to the server to process and validate all the network packets it receives. Therefore, the server must allocate valuable resources to processing and validating the UDP packets. Additionally, because nothing prevents UDP packets from entering the server, the server is responsible for mitigating possible security threats delivered via the UDP packets.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for mitigating a threat associated with network data packets. According to one of the approaches of the present disclosure, a system for mitigating a threat associated with network data packets is provided. Specifically, the system may include an authentication server configured to receive a request for access to a server from a client. The authentication server may be configured to authenticate the client. The authentication may include providing an authentication token to the client. The system may further include a mitigation device configured to receive, from the client, at least one network packet directed to the server. The at least one network packet may have the authentication token embedded into the at least one network packet. The mitigation device may be further configured to validate authenticity of the authentication token and based on the validation, selectively forward the at least one network packet to the server. The authentication token may be independently generated by the authentication server, the mitigation device, and the server using a shared token generation algorithm based on a hash salt value.

According to another approach of the present disclosure, a method for mitigating a threat associated with network data packets is provided. The method may commence with receiving, by an authentication server, a request for access to a server from a client. The method may further include authenticating the client by the authentication server. The authentication may include providing an authentication token to the client. The method may continue with receiving, by a mitigation device, from the client, at least one network packet directed to the server. The at least one network packet may embed the authentication token. The method may further include validating, by the mitigation device, authenticity of the authentication token and selectively forwarding, based on the validation, the at least one network packet to the server. The authentication token may be independently generated by the authentication server, the mitigation device, and the server using a shared token generation algorithm based on a hash salt value.

In further example embodiments of the present disclosure, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
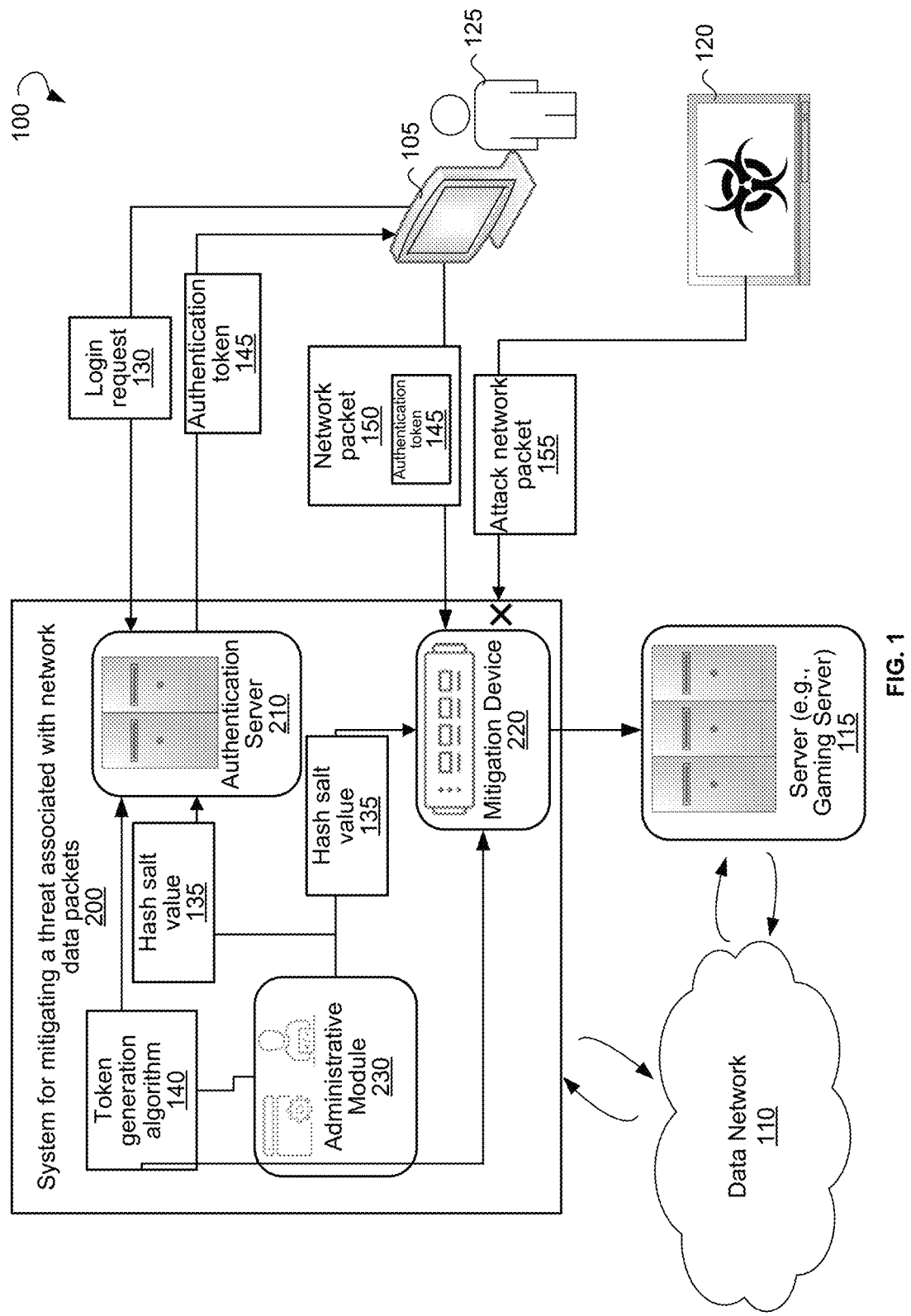
FIG. 1 shows an environment, within which methods and systems for mitigating a threat associated with network data packets can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to mitigating a threat associated with network data packets. A system and a method for mitigating a threat associated with network data packets are configured to validate network packets received from clients. The network packets may include network packets associated with any UDP-based application and its associated services. The system of the present disclosure may act as a threat mitigation system (TPS) associated with the server and may intercept all requests directed to the server. The system may use a shared token generation algorithm according to which a formula-driven and statically generated hash salt value (also referred to as a salt value or a salt) is provided to an authentication server and a mitigation device of the system. As used in cryptography, a salt is a random value/values used as an additional input to a hash function that hashes sensitive data, such as passwords, that must be protected against unauthorized access.

The client may send a login request to establish a connection with a server. The login request may be intercepted by the authentication server configured to enable logging in and authenticating the clients. Upon receiving the login request form the client, the authentication server may generate an authentication token (e.g., a 4-byte fixed token) based on the hash salt value using the shared token generation algorithm. The authentication server may authenticate the client, for example, by checking client credentials provided in the login request. Once the login request is authenticated and the authentication token is generated, the authentication server sends the authentication token to the client in response to the login request.

Network packets further sent by the client to the server need to include the authentication token. The authentication token embedded into the network packets by the client may act as a network packet watermark. The mitigation device of the TPS may be configured to validate the network packets of the client for compliance by determining whether the network packets include the authentication token. Specifically, the mitigation device may generate an authentication token based on the hash salt value using the shared token generation algorithm. If the authentication token generated by the mitigation device is the same as the authentication token embedded into the network packet received from the client, the client is legitimate and the network packet can be allowed. The conforming network packets, i.e., the network packets that include the authentication token, are forwarded to the server, while the non-conforming network packets are dropped or captured for post analysis.

The use of the shared token generation algorithm allows for high-performance validation of client network packets and mitigation of threats carried by non-conforming network packets known as attack network packets or Distributed Denial of Service (DDoS) attack traffic. The system may mitigate a threat associated with non-conforming network packets and forward only the validated network packets to the server. Additionally, as illegitimate network packets are captured before the illegitimate network packets reach the server, the server is not exposed to network attacks as the networks attacks are mitigated before reaching the server.

Furthermore, the system takes the burden of validating network packets from the server and offloads the server. Therefore, the server does not need to spend resources on generation of the authentication token, comparing the authentication token with the authentication token present in the network packet, and dropping network packets that failed the validation. Instead, the server directly processes all network packets received from the mitigation device because the network packets have already been validated and allowed by the mitigation device.

Therefore, the system performs full UDP protocol validation for every client of which the network packets are forwarded through the mitigation device. The system ensures that only clients that comply with compliance requirements are being forwarded to the server/servers, while network packets of any client that does not meet the compliance requirements are dropped. Thus, the system provides a security mechanism for multiple industries, e.g., the gaming industry, since the system permits only watermarked traffic to reach the protected servers and does not allow malicious users or bots to penetrate a server as the attack traffic is dropped.

Referring now to the drawings, FIG. 1 illustrates an environment 100 within which methods and systems for mitigating a threat associated with network data packets can be implemented. The environment 100 may include a system 200 for mitigating a threat associated with network data packets, a client 105, a server 115, an attacker 120, and a data network 110.

The client 105 may include a computing device associated with a user 125, such as a personal computer (PC), a handheld computer, a smart phone, a tablet PC, a laptop, a server, a wearable device, an Internet-of-things device, or any other computer system. In an example embodiment, the client 105 may include a gaming client enabling the user 125 to play games using the server 115. The server 115 may include one server or a plurality of servers. In an example embodiment, the server 115 may include a gaming server configured to run one or more games and enable the user 125 to play the one or more games using the client 105.

The attacker 120 may include an entity that sends attack traffic to the server 110. The attacker 120 may include a device running a malicious software, a bot, a botnet represented by a group of hijacked Internet-connected devices, and so forth.

The client 105, the server 115, and the system 200 may be connected to and communicate with each other via the data network 110. The data network 110 may include the Internet, a computing cloud, or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a Bluetooth™ network, a Wi-Fi™ network, a $3^{rd}$ Generation (3G)/$4^{th}$ Generation (4G)/$5^{th}$ Generation (5G) network, a Long-Term Evolution network, a virtual private network, a storage area network, a frame relay connection, an Advanced Intelligent Network connection, a synchronous optical network connection, a digital Transmission System Level 1 (T1), Transmission System Level 3 (T3), E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an Institute of Electrical and Electronics Engineers (IEEE) 802.11-based radio frequency network. The data network can further include or interface with any one or more of a Recommended Standard 232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes, that are interconnected for the purpose of data communication.

The system 200 may include an authentication server 210, a mitigation device 220, and an administrative module 230. The authentication server 210 may include one authentication server or a plurality of authentication servers. The authentication server 210 may be responsible for managing an administration and orchestration workflow process in the system 200. The administrative module 230 may be configured to provide a hash salt value 135 and a token generation algorithm 140 to each of the authentication server 210, the mitigation device 220, and the server 115. The authentication server 210, the mitigation device 220, and the server 115 may be configured to use the hash salt value 135 to generate an authentication token 145 using the token generation algorithm 140. Therefore, as the same token generation algorithm 140 and the same hash salt value 135 are shared among the authentication server 210, the mitigation device 220, and the server 115, the authentication token 145 generated by the authentication server 210, the mitigation device 220, and the server 115 is the same.

When the user 125 wants to play a game running on the server 115, the user 125 may need to log into a user account associated with the game. The client 105 may send a login request 130 to the server 115. The system 200 acts as a TPS for the server 115 and may intercept network packets sent to the server. Specifically, the authentication server 210 may receive the login request 130 sent by the client 105. In response to the login request 130, the authentication server 210 may send the authentication token 145 to the client 105. The client 105 may receive the authentication token 145 and embed the authentication token 145 into all further network packets sent by the client 105 to the server 105. Specifically, the client 105 may send a network packet 150 with the authentication token 145 embedded into the network packet 150. Therefore, the authentication token 145 may serve as a watermark embedded into the network packet 150.

The mitigation device 220 may receive the network packet 150 and determine if the authentication token 145 is present in the network packet 150. Upon identifying the authentication token 145 is present in the network packet 150, the mitigation device 220 may retrieve the authentication token 145 from the network packet 150 and analyze the authentication token 145. Specifically, the mitigation device 220 may match the authentication token 145 received from the client 105 with an authentication token generated by the mitigation device 220 based on the hash salt value 135 using the token generation algorithm 140. If the authentication tokens match, the mitigation device 220 may determine the network packet 150 to be legitimate and forward the network packet 150 to the server 115.

The mitigation device 220 may receive a network packet and determine that the network packet does not have any authentication token or the authentication token in the network packet does not match the authentication token generated by the mitigation device 220. In this case, the mitigation device 220 may determine that the network packet is an attack network packet 155. The attack network packet 155 may be sent by the attacker 120. Based on the determination that the network packet is the attack network packet 155, the mitigation device 220 may mitigate a threat associated with the attack network packet 155, e.g., by dropping the attack network packet 155 or capturing and storing the attack network packet 155 for post analysis.

Figure 2:
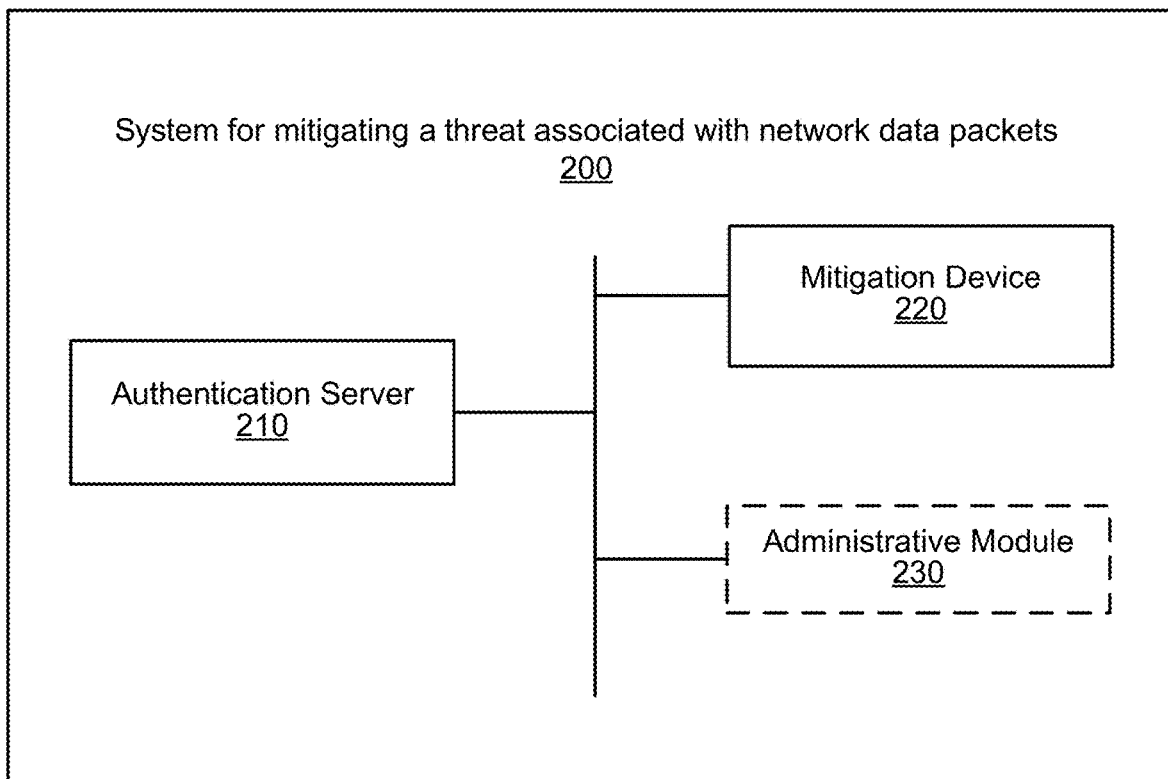
FIG. 2 is a block diagram illustrating modules of a system for mitigating a threat associated with network data packets, according to an example embodiment.

FIG. 2 shows a block diagram illustrating various modules of a system 200 for mitigating a threat associated with network data packets, according to an example embodiment. Specifically, the system 200 may include an authentication server 210, a mitigation device 220, and optionally an administrative module 230. Each of the authentication server 210, the mitigation device 220, and the administrative module 230 may be implemented by a processor or a network node described in detail with reference to FIG. 4. The operations performed by the authentication server 210, the mitigation device 220, and the administrative module 230 are described in detail below with reference to FIG. 3.

Figure 3:
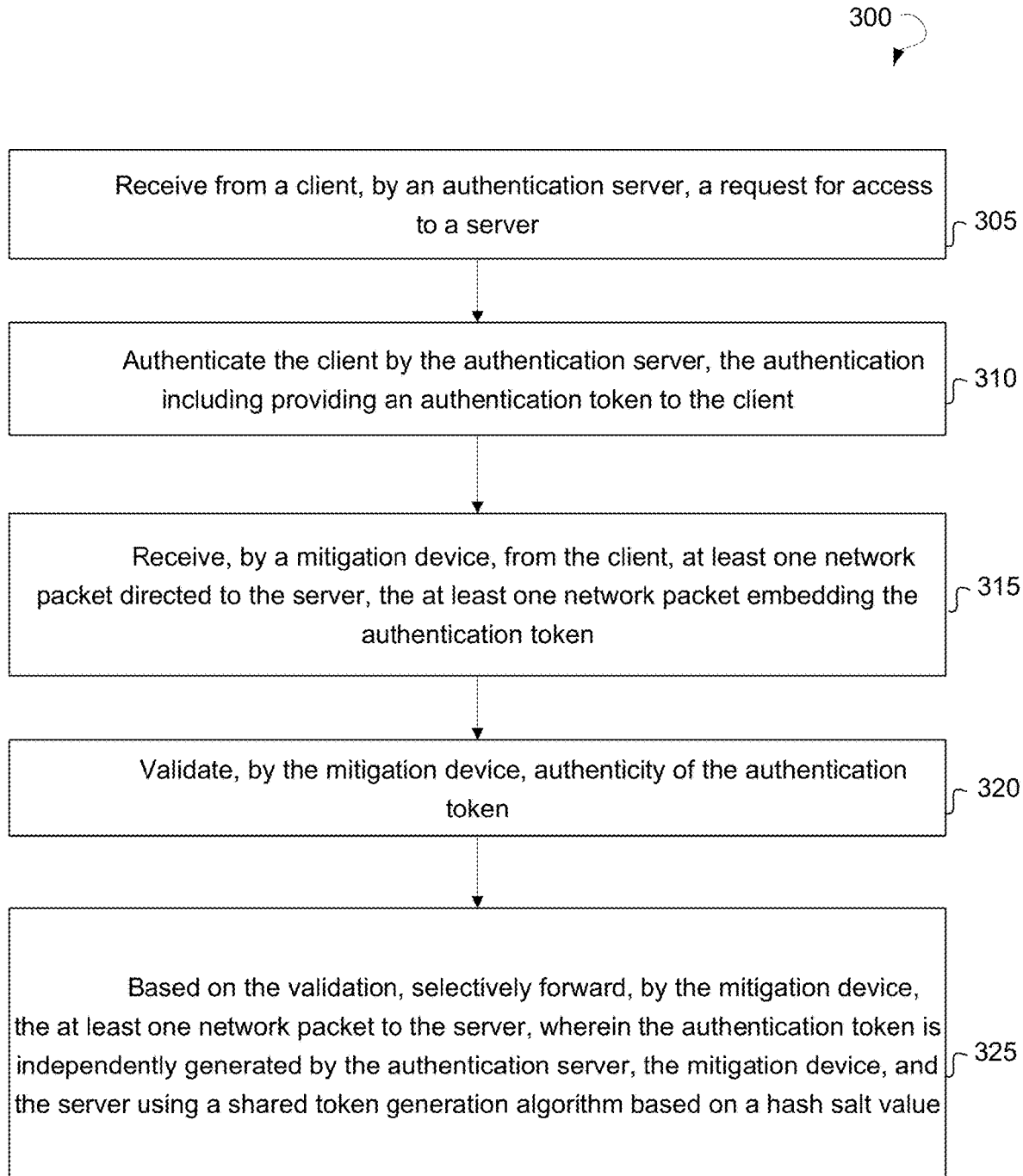
FIG. 3 is a flow diagram illustrating a method for mitigating a threat associated with network data packets, according to an example embodiment.

FIG. 3 shows a process flow diagram of a method 300 for mitigating a threat associated with network data packets, according to an example embodiment. In some embodiments, operations of the method 300 may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

An administrative module may be configured to receive parameter settings for a shared token generation algorithm also referred to as a token computation formula and a hash salt value. The shared token generation algorithm may be, for example, the Message-Digest 5 (MD5) message-digest algorithm of a combination of tuples. In an example embodiment, the token computation formula and the hash salt value may be set in a UDP template, which can be available to the administrative module, the mitigation device, and the server. The parameter settings may be provided by an administrator of the system 200, selected based on predetermined criteria, and so forth.

The administrative module may provide the shared token generation algorithm and the hash salt value to an authentication server, a mitigation device, and a server. Each of the authentication server, the mitigation device, and the server may be configured to independently generate an authentication token using the shared token generation algorithm based on the hash salt value. The authentication token may be generated using a hash function. The hash function may be predetermined by the administrative module.

In an example embodiment, the hash salt value may be a static salt that may be the same over time while the hash function and the shared token generation algorithm remain the same. The hash salt value used for generation of authentication tokens for different clients may be the same. The authentication token may be different for each client based on parameters of the shared token generation algorithm. In an example embodiment, a unique authentication token is generated and used for a server, each client, or per each session, based on the mode, and so forth.

In example embodiments, to ensure the robustness of the service provided by the system 200 and increased token security, the authentication token may be changed in intervals of minutes or hours under optimal conditions and a few times per minute when under attack.

The method 300 may commence with receiving from a client, by the authentication server, a request for access to the server at operation 305. In an example embodiment, the client may include a gaming client and the server may include a gaming server. The request may be a login request.

The method 300 may further include authenticating the client by the authentication server at operation 310. In an example embodiment, the authentication may include logging in by the client into the authentication server, i.e., authenticating the login request based on data provided in the login request. Upon the authentication, the authentication server may send an authentication token to the client.

The method 300 may continue with receiving, by the mitigation device, from the client, at least one network packet directed to the server at operation 315. The at least one network packet may embed the authentication token. The at least one network packet may include a UDP packet. The authentication token may be part of a UDP payload associated with the UDP packet.

For example, the shared token generation algorithm stipulates using "token-authentication-formula md5_Salt-SrcIp-SrcPort-DstIp-DstPort," there is a client at 1.1.1.1:1111 address that wants to talk to the server at 192.168.1.1:53 address, and a current hash salt value is 123456. When the authentication server receives a login request from the client, the authentication server computes an authentication token as md5(123456-1.1.1.1-1111-192.168.1.11-53) and truncates the authentication token to 32 bits. Then the authentication server passes this value to the client. From then on, the client has to send network packets with this authentication token in the first 4 bytes of a UDP payload of the network packets.

The method 300 may further include validating, by the mitigation device, authenticity of the authentication token at operation 320. The mitigation device may generate an authentication token using the shared token generation algorithm based on the hash salt value received from the administrative module. The mitigation device may perform the validation by matching the authentication token generated by the mitigation device and the authentication token received from the client. If the authentication tokens match, the mitigation device may determine the network packet to be valid.

The method 300 may continue at operation 325 with selectively forwarding, by the mitigation device, the at least one network packet to the server based on the validation of the authenticity of the authentication token. In an example embodiment, the authentication token may be valid for a single session associated with the client, for example, for a current login of the user into the authentication server. In further example embodiments, the authentication token may be valid for a plurality of sessions associated with the client (i.e., for the current session and further sessions (e.g., further logins of the client into the authentication server) within predetermined period of time).

Therefore, the mitigation device validates the authentication token existence on every network packet and forwards only network packets carrying valid authentication tokens (watermarks) to a server/servers (a backend server/servers), while any network packet not matching the compliance requirements is dropped by the mitigation device.

The mitigation device may be configured to mitigate a threat associated with the at least one network packet if the authentication token fails the validation. The mitigation may include dropping the at least one network packet, capturing and storing the at least one network packet for post analysis, and so forth. In an example embodiment, the post analysis may include determining a structure of network packets that failed the validation and filtering further network traffic based on the structure of network packets. The post analysis may further include determining a type of attack associated with the network packets that failed the validation and selecting measures to prevent the attacks. The post analysis may further include analyzing invalid authentication tokens, determining patterns associated with the invalid authentication tokens, and dropping further network packets having authentication tokens generated based on the determined patterns.

In an example embodiment, the mitigation device may receive a network packet and determine that the network packet does not have any authentication token. The mitigation device may determine that the network packet missing the authentication token fails the validation and drop the network packet.

In an example embodiment, as the authentication server provides the shared token generation algorithm and the hash salt value to the server, the server may be configured to generate the authentication token by itself. In this embodiment, the server may have a threat protection module having the functionality of the mitigation device. Therefore, this embodiment may not require the mitigation device as a separate middleman device between the server and the client. The threat protection module of the server may be configured to generate the authentication token based on the shared token generation algorithm and using the hash salt value and validate the network packets received from the client. The server may match the authentication token generated by the server and the authentication token received from the client in the network packet. If the network packet does not have the authentication token or the authentication token does not match the authentication token generated by the server, the server may determine the network packet to be invalid and drop the network packet.

Because the authentication server may not know the source Internet Protocol (IP) address and source port of each client, Ternary Content Addressable Memory (TCAM) entries may not be entered to the authentication server until the first network packet is received. Every time the authentication server receives network packets, the authentication server may check the TCAM entries to see if the network packet requires validation using the hash function.

In an example embodiment, the network packet is the first network packet from a new client so there is no matched TCAM entry and no matched session. The authentication server and the mitigation device may validate the client as follows. For example, current salt value is 123456, and client 1 (1.1.1.1:1111) is a valid client who sends the correct authentication token md5(123456-1.1.1.1-1111-192.168.1.11-53). Client 2 (2.2.2.2:2222) is an invalid client who sends arbitrary payload. When the network packet comes, the mitigation device extracts the first 4 bytes of the UDP payload and checks if the first 4 bytes are equal to the authentication token. For example, client 1 may have: token1=md5(123456-1.1.1.1-1111-192.168.1.11-53), then crc32-hash1=crc32(123456, 1.1.1.1, 1111, 192.168.1.11, 53, token1). Client 2 may have: token2=md5(123456-2.2.2.2-

2222-192.168.1.11-53), then crc32-hash2=crc32(salt, 2.2.2.2, 2222, 192.168.1.11, 53, token2). Based on the validation, it is determined that client 1 is valid and client 2 is invalid. The address of client 1 may be entered into the TCAM entry. Client 1 may be validated as legitimate in further communications.

In an example embodiment, the system 200 may have two modes of operation, namely one-to-one mode and many-to-one mode. In one-to-one mode, each client communicates with a unique server (i.e., only one valid client can talk to the server). The authentication token is only applicable and valid for the current client session, and the client needs to acquire another authentication token if the client wishes to create more sessions with the same server. Therefore, there is only one valid crc32-hash salt value for a (dst-ip, dst-port) pair. The TCAM entry may be written with a source mask as follows: TCAM-entry1=(src-ip=0, dst-ip=192.168.1.11, src-port=0, dst-port=53, crc32-hash1). In this way, every network packet that comes to the 192.168.1.11:53 address of the server may need to undergo the validation, regardless of the sources of the network packets. Finally, only client 1 may pass the validation. Therefore, the mitigation device may verify the first valid client and forward the network traffic of the first valid client to the server. After the first client is verified, network packets from other clients may be dropped.

In many-to-one mode, many clients communicate with the same server. One authentication token can be applicable and made valid for a client with multiple sessions or for a server with multiple clients. The client can use the same token for new sessions if the client wishes to create more sessions with the same server. The mitigation device may verify payload of network packets of every client. As long as the authentication token is correct, the mitigation device may forward the network traffic of the clients to the server. The TCAM entry may be written without a source mask as follows: TCAM-entry1=(src-ip=1.1.1.1, dst-ip=192.168.1.11, src-port=1111, dst-port=53, crc32-hash1). In both modes, the mitigation device may create client 1 and client 2 sessions. The authentication token 1 may be stored in client 1 session, and authentication token 2 may be stored in client 2 session.

If a network packet is from an old and known client, there is a matched session in a database and the network packet may undergo the validation as follows. The first 4 bytes of the UDP payload may be extracted together with (salt, src-ip, dst-ip, src-port, dst-port) to compute a crc32 hash.

If the computation result does not match the hash salt value in the TCAM entry, the network packet fails the validation, is assigned with an error flag, and is dropped. If the computation result matches the hash salt value in the TCAM entry, the network packet passes the validation and an error flag is not assigned to the network packet. Then the mitigation device may check the payload to see if the payload is equal to the authentication token in that session. The network packet may be forwarded to the server if the payload is equal to the authentication token and may be dropped if the payload is not equal to the authentication token.

Figure 4:
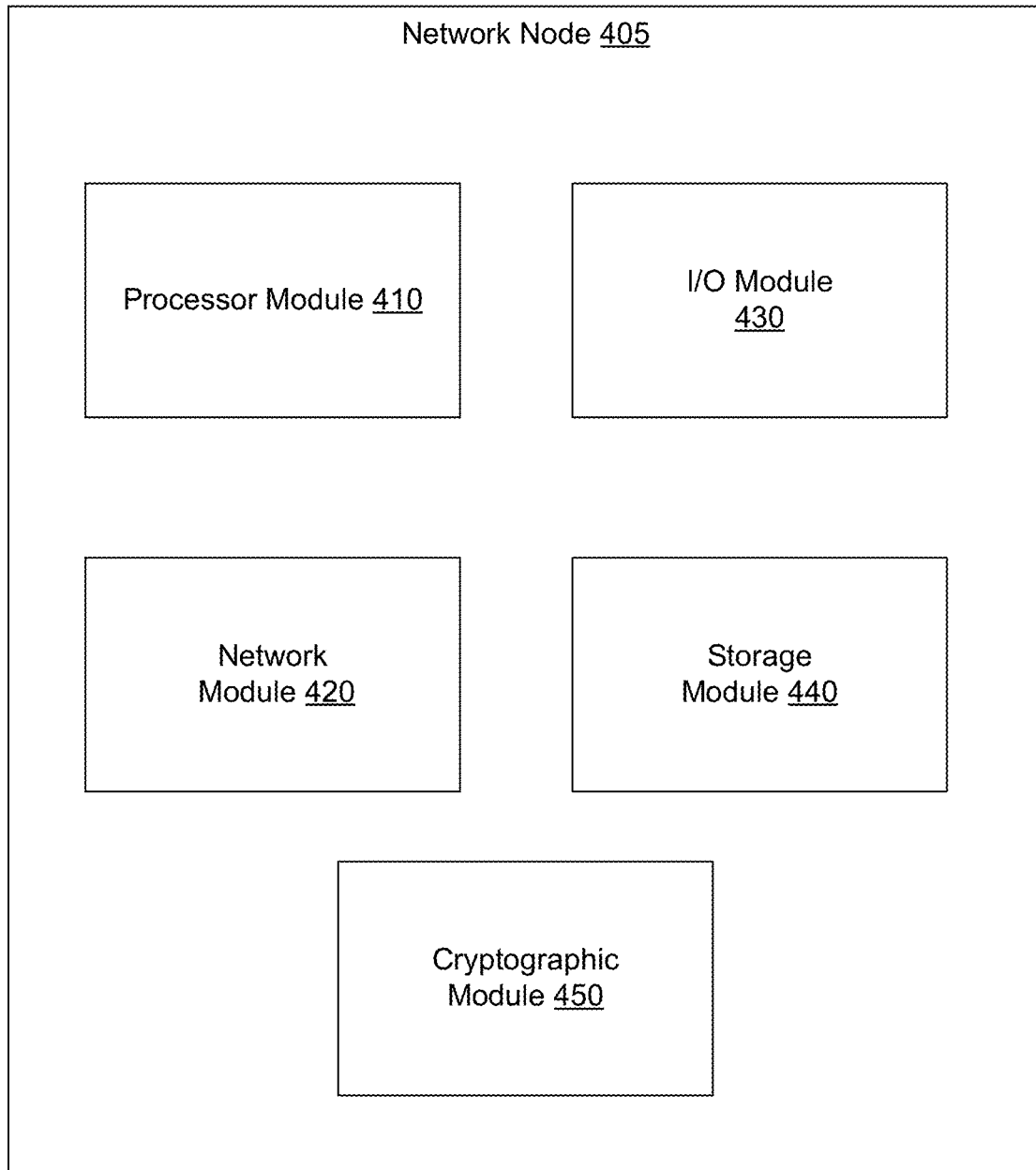
FIG. 4 is a block diagram illustrating a network node, according to an example embodiment.

FIG. 4 is a block diagram illustrating a network node 405, according to an example embodiment. In an example embodiment, any of an authentication server 210, a mitigation device 220, an administrative module 230, a client 105, and a server 115 shown in FIG. 1 may be configured in a form of a network node 405 illustrated in FIG. 4.

In an example embodiment, the network node 405 includes a processor module 410, a network module 420, an input/output (I/O) module 430, a storage module 440, and a cryptographic module 450. The processor module 410 may include one or more processors, such as a microprocessor, an Intel processor, an Advanced Micro Devices processor, a microprocessor without interlocked pipeline stages, an advanced restricted instruction set computer (RISC) machine-based processor, or a RISC processor. In an example embodiment, the processor module 410 may include one or more processor cores embedded in the processor module 410. In a further example embodiment, the processor module 410 may include one or more embedded processors, or embedded processing elements in a Field Programmable Gate Array, an Application Specific Integrated Circuit, or a Digital Signal Processor. In an example embodiment, the network module 420 may include a network interface such as Ethernet, an optical network interface, a wireless network interface, T1/T3 interface, a WAN interface, or a LAN interface. In a further example embodiment, the network module 420 may include a network processor. The storage module 440 may include Random-access memory (RAM), Dynamic Random Access Memory, Static Random Access Memory, Double Data Rate Synchronous Dynamic Random Access Memory, or memory utilized by the processor module 410 or the network module 420. The storage module 440 may store data utilized by the processor module 410. In an example embodiment, the storage module 440 may include a hard disk drive, a solid state drive, an external disk, a Digital Versatile Disc (DVD), a compact disk (CD), or a readable external disk. The storage module 440 may store one or more computer programming instructions which when executed by the processor module 410 or the network module 420 may implement one or more of the functionality of the methods and systems for measuring application response delay described herein. In an example embodiment, the I/O module 430 may include a keyboard, a keypad, a mouse, a gesture-based input sensor, a microphone, a physical or sensory input peripheral, a display, a speaker, or a physical or sensual output peripheral.

The cryptographic module 450 may include one or more hardware-based cryptographic computing modules to perform data encryption and/or decryption and generation/calculation of authentication tokens.

Figure 5:
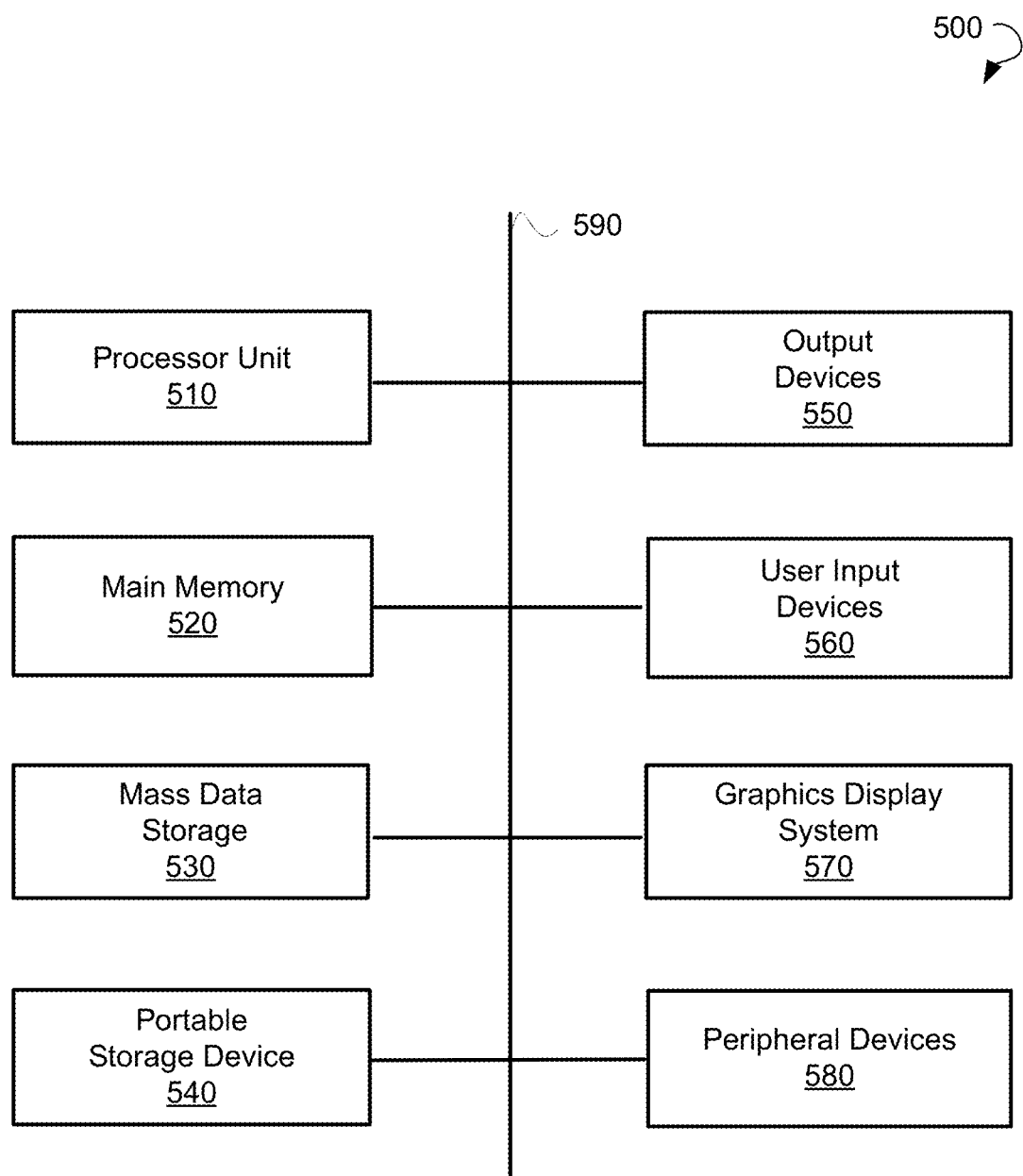
FIG. 5 shows a diagrammatic representation of a computing device for a machine, within which a set of instructions for causing the machine to perform any one or more of the methodologies discussed herein can be executed.

FIG. 5 illustrates a computer system 500 that may be used to implement embodiments of the present disclosure, according to an example embodiment. The computer system 500 may serve as a computing device for a machine, within which a set of instructions for causing the machine to perform any one or more of the methodologies discussed herein can be executed. The computer system 500 can be implemented in the contexts of the likes of computing systems, networks, servers, or combinations thereof. The computer system 500 includes one or more processor units 510 and main memory 520. Main memory 520 stores, in part, instructions and data for execution by processor units 510. Main memory 520 stores the executable code when in operation. The computer system 500 further includes a mass data storage 530, a portable storage device 540, output devices 550, user input devices 560, a graphics display system 570, and peripheral devices 580. The methods may be implemented in software that is cloud-based.

The components shown in FIG. 5 are depicted as being connected via a single bus 590. The components may be connected through one or more data transport means. Processor units 510 and main memory 520 are connected via a local microprocessor bus, and mass data storage 530, peripheral devices 580, the portable storage device 540, and graphics display system 570 are connected via one or more I/O buses.

Mass data storage 530, which can be implemented with a magnetic disk drive, solid state drive, or an optical disk drive, is a non-volatile storage device for storing data and instructions for use by processor units 510. Mass data storage 530 stores the system software for implementing embodiments of the present disclosure for purposes of loading that software into main memory 520.

The portable storage device 540 operates in conjunction with a portable non-volatile storage medium, such as a floppy disk, a CD, a DVD, or a USB storage device, to input and output data and code to and from the computer system 500. The system software for implementing embodiments of the present disclosure is stored on such a portable medium and input to the computer system 500 via the portable storage device 540.

User input devices 560 provide a portion of a user interface. User input devices 560 include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 includes output devices 550. Suitable output devices include speakers, printers, network interfaces, and monitors.

Graphics display system 570 includes a liquid crystal display or other suitable display device. Graphics display system 570 receives textual and graphical information and processes the information for output to the display device. Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 can be a PC, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for mitigating a threat associated with network data packets have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for mitigating a threat associated with network data packets, the system comprising:
   an authentication server configured to:
      receive, from a client, a request for access to a first server; and
      authenticate the client, the authentication including providing an authentication token to the client; and
   a mitigation device configured to:
      receive, from the client, at least one network packet directed to the first server, the at least one network packet embedding the authentication token;
      validate authenticity of the authentication token; and
      based on the validation, selectively forward the at least one network packet to the first server, wherein the authentication token is independently generated by the authentication server, the mitigation device, and the first server using a shared token generation algorithm based on a hash salt value.

2. The system of claim 1, further comprising an administrative module configured to provide the shared token generation algorithm and the hash salt value.

3. The system of claim 2, wherein the administrative module is configured to receive parameter settings for the shared token generation algorithm.

4. The system of claim 1, wherein the at least one network packet includes a User Datagram Protocol (UDP) packet, the authentication token being part of a UDP payload associated with the UDP packet.

5. The system of claim 1, wherein the mitigation device is further configured to mitigate a threat associated with the at least one network packet when the authentication token fails the validation.

6. The system of claim 5, wherein the mitigation includes one of dropping the at least one network packet and capturing the at least one network packet for post analysis.

7. The system of claim 1, wherein the authentication includes logging in by the client into the authentication server.

8. The system of claim 1, wherein the client is a gaming client and the server is a gaming server.

9. The system of claim 1, wherein the authentication token is valid for one of the following:
a single session associated with the client; and
a plurality of sessions associated with the client.

10. The system of claim 1, wherein the authentication token is generated using a hash function.

11. A method for mitigating a threat associated with network data packets, the method comprising:
receiving, from a client, by an authentication server, a request for access to a first server;
authenticating the client by the authentication server, the authentication including providing an authentication token to the client;
receiving, by a mitigation device, from the client, at least one network packet directed to the first server, the at least one network packet embedding the authentication token;
validating, by the mitigation device, authenticity of the authentication token; and
based on the validation, selectively forwarding, by the mitigation device, the at least one network packet to the first server, wherein the authentication token is independently generated by the authentication server, the mitigation device, and the first server using a shared token generation algorithm based on a hash salt value.

12. The method of claim 11, wherein the shared token generation algorithm and the hash salt value are provided by an administrative module.

13. The method of claim 12, wherein the administrative module is configured to receive parameter settings for the shared token generation algorithm.

14. The method of claim 11, wherein the at least one network packet includes a User Datagram Protocol (UDP) packet, the authentication token being part of a UDP payload associated with the UDP packet.

15. The method of claim 11, further comprising mitigating a threat associated with the at least one network packet by the mitigation device when the authentication token fails the validation.

16. The method of claim 15, wherein the mitigation includes one of dropping the at least one network packet and capturing the at least one network packet for post analysis.

17. The method of claim 11, wherein the authentication includes logging in by the client into the authentication server.

18. The method of claim 11, wherein the authentication token is valid for one of the following:
a single session associated with the client; and
a plurality of sessions associated with the client.

19. The method of claim 11, wherein the authentication token is generated using a hash function.

20. A system for mitigating a threat associated with network data packets, the system comprising:
an authentication server configured to:
receive, from a client, a request for access to a first server; and
authenticate the client, the authentication including providing an authentication token to the client;
a mitigation device configured to:
receive, from the client, at least one network packet directed to the first server, the at least one network packet embedding the authentication token;
validate authenticity of the authentication token;
based on the validation, selectively forward the at least one network packet to the first server, wherein the authentication token is independently generated by the authentication server, the mitigation device, and the first server using a shared token generation algorithm based on a hash salt value; and
mitigate a threat associated with the at least one network packet when the authentication token fails the validation; and
an administrative module configured to:
receive parameter settings for the shared token generation algorithm; and
provide the shared token generation algorithm and the hash salt value.

* * * * *